United States Patent [19]
Schultz

[11] Patent Number: 4,819,830
[45] Date of Patent: Apr. 11, 1989

[54] VENTED HATCH COVER

[75] Inventor: Francis R. Schultz, Woodridge, Ill.

[73] Assignee: Salco Products Incorporated, Romeoville, Ill.

[21] Appl. No.: 155,088

[22] Filed: Feb. 11, 1988

[51] Int. Cl.$^4$ .............................................. B65D 51/16
[52] U.S. Cl. ..................................... 220/371; 220/374; 220/314; 105/377
[58] Field of Search ............... 220/314, 366, 371, 373, 220/374; 105/377

[56] References Cited

U.S. PATENT DOCUMENTS 4,127,216 11/1978 Martin, Jr. et al. ................. 220/374
4,609,126 9/1986 Janda .................................. 220/374
4,655,365 4/1987 Miller ................................. 220/314

Primary Examiner—George T. Hall
Attorney, Agent, or Firm—Kinzer, Plyer, Dorn, McEachran & Jambor

[57] ABSTRACT

A vented hatch cover for an enclosed vessel having a shell member sized to overlie and cover a hatch opening defined by an upstanding coaming. It includes a peripheral seal to seal against coaming. The shell member has at least one air passage extending through it. A wall is integrally formed on the shell member and defines a plenum in communication with the air passage. The wall extends outward beyond the peripheral seal and there defines an air intake opening for admitting air to the plenum. An air filter is housed in the plenum.

19 Claims, 3 Drawing Sheets

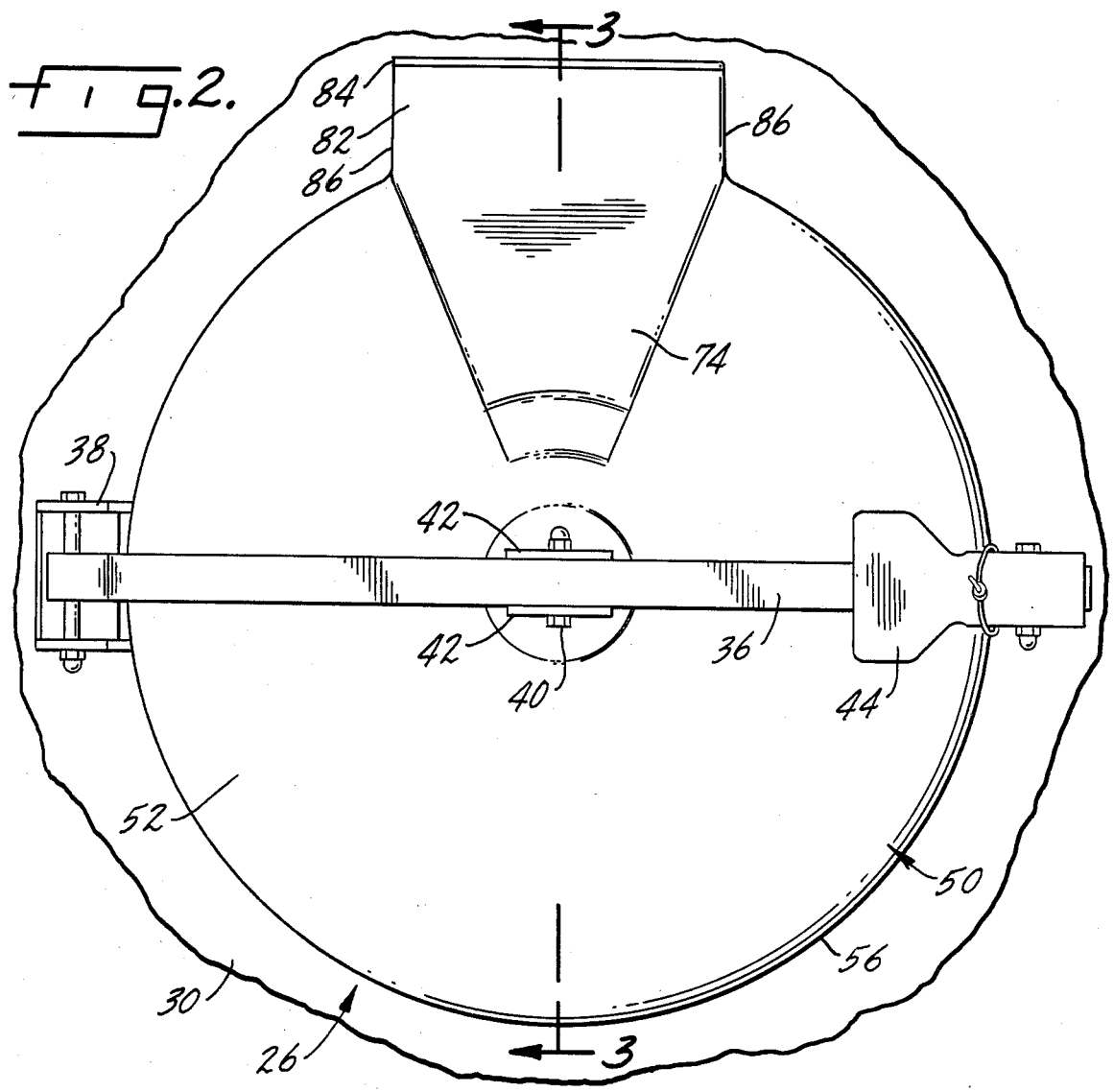
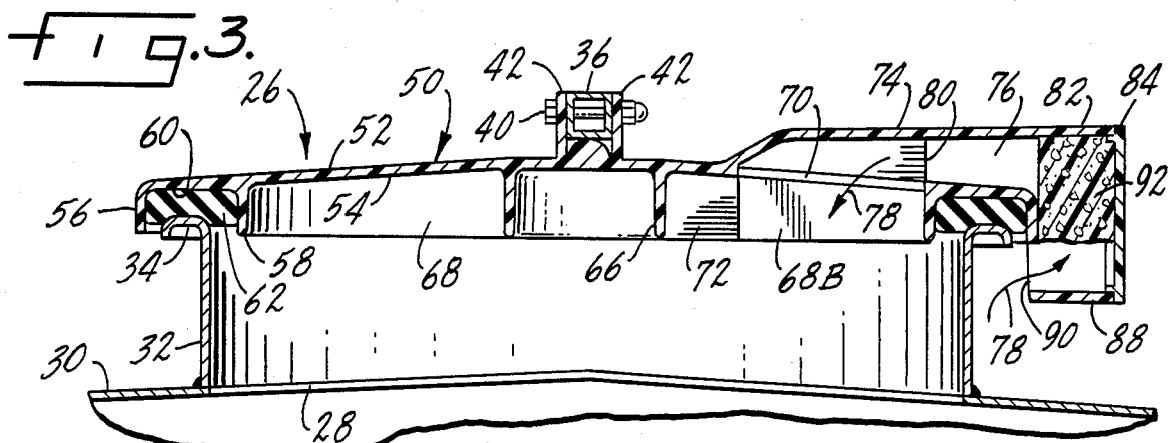
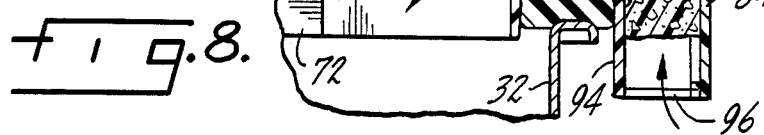

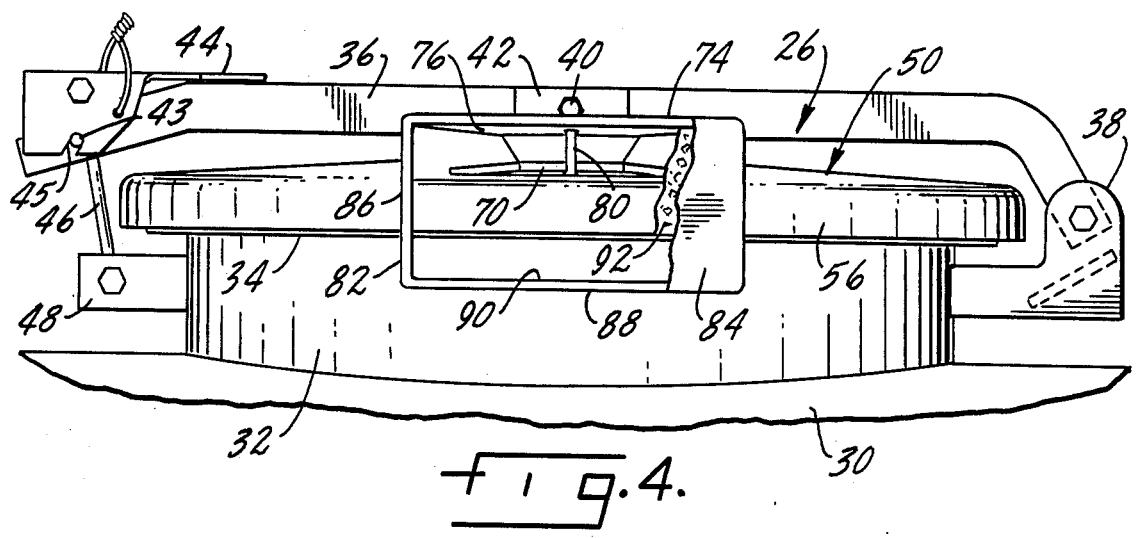
Fig. 4.
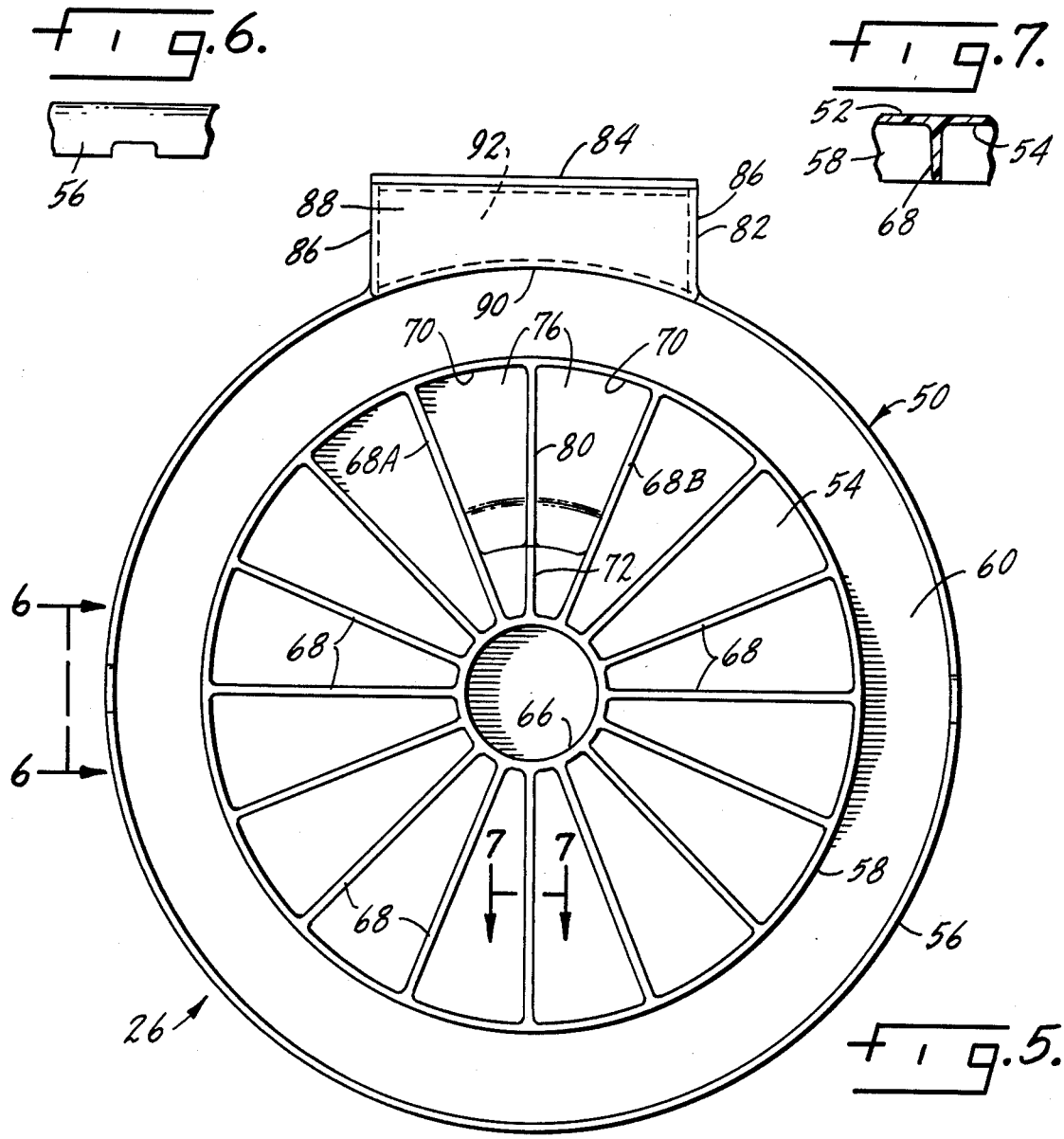
Fig. 6.
Fig. 7.
Fig. 5.

VENTED HATCH COVER

BACKGROUND OF THE INVENTION

Railroad hopper cars carrying bulk particulate matter, such as grain or plastic pellets, are typically unloaded by applying a vacuum conveying line to an outlet gate positioned at the bottom of each car compartment. The primary air flow for the vacuum conveying line is obtained from the exterior of the car. That is, the exhaust air for unloading is not drawn from the car compartment through the particulate matter. Nevertheless, the top of the car compartment must be vented to compensate for material drawn out the bottom of the compartment. Failure to vent the top of the compartment would reduce the efficiency of the vacuum unloading process and even risk damage to the car structure. Certain cars have been equipped with vents, but these are inadequate for unloading purposes. Brown, U.S. Pat. No. 2,324,356 is an example. Most commonly, venting for unloading of hopper cars has been achieved by propping open at least one hatch cover on each hopper compartment being unloaded.

Opening hatch covers presents disadvantages. First, some means permitting safe access to the top of the railroad car must be provided. One possibility is to attach ladders and platforms to the car which a worker can use to climb onto the top of the car. Or the unloading facility may have a gantry or the like, providing safe access to the top of the railroad car. Either of these methods unduly complicates the necessary facilities. Secondly, open hatches tend to invite security problems. Not only is there a risk of contaminating the lading due to the open hatch, but also empty compartments are tempting disposal sites for assorted refuse after the lading has been removed. Further, unless the hatch cover is secured by hinges or the like, there is a possibility of the cover being misplaced.

A vented hatch cover for use in the interior of a car is taught by Talmey, U.S. Pat. No. 2,641,202. In essence, Talmey has a double-walled roof structure with a sealed hatch door on the outer wall and a vent in a hatch cover in the inner wall which overlies the hatch opening. If the roof hatch is open, any contaminant such as rain, snow, or the like, may enter the associated vessel directly through the filter. If the roof hatch is not open, only air, available between the walls of the car, can enter the compartment through the inner cover but exterior air is not available.

SUMMARY OF THE INVENTION

The present invention overcomes the problems described above by providing a vented hatch cover for a vessel which need not be opened to accommodate unloading of the associated vessel. The inlet air opening of the hatch cover of the present invention is positioned outward of that portion of the cover which overlies the hatch opening to prevent egress of contaminants into the associated vessel. It supplies sufficient venting to compensate for lost volume as the vessel is emptied.

The hatch cover comprises a shell member sized to fit over the hatch opening, in engagement with the hatch coaming. The shell member defines an air passage permitting air flow through the shell. A wall is formed upon the shell member and defines a plenum or air flow duct from the atmosphere to the air passage. The wall defines an air intake opening beyond the periphery of the shell member which admits air to the plenum. An air filter element may be disposed in the plenum.

BRIEF DESCRIPTION OF THE DRAWINGS

FIG. 2 is a plan view of the vented hatch cover.
FIG. 3 is a section taken along line 3—3 of FIG. 2.
FIG. 4 is a side elevation view of the vented hatch cover, with portions cut away to show part of the interior of the air flow duct formed by the plenum.
FIG. 5 is an underside plan view of the vented hatch cover.
FIG. 6 is a side elevation view of a detail of the hatch cover rim, looking in the direction of line 6—6 of FIG. 5.
FIG. 7 is a section taken along line 7—7 of FIG. 5.
FIG. 8 is a section similar to FIG. 3, showing an alternate embodiment of the hood.

DETAILED DESCRIPTION OF THE ILLUSTRATED EMBODIMENTS

Figure 1:
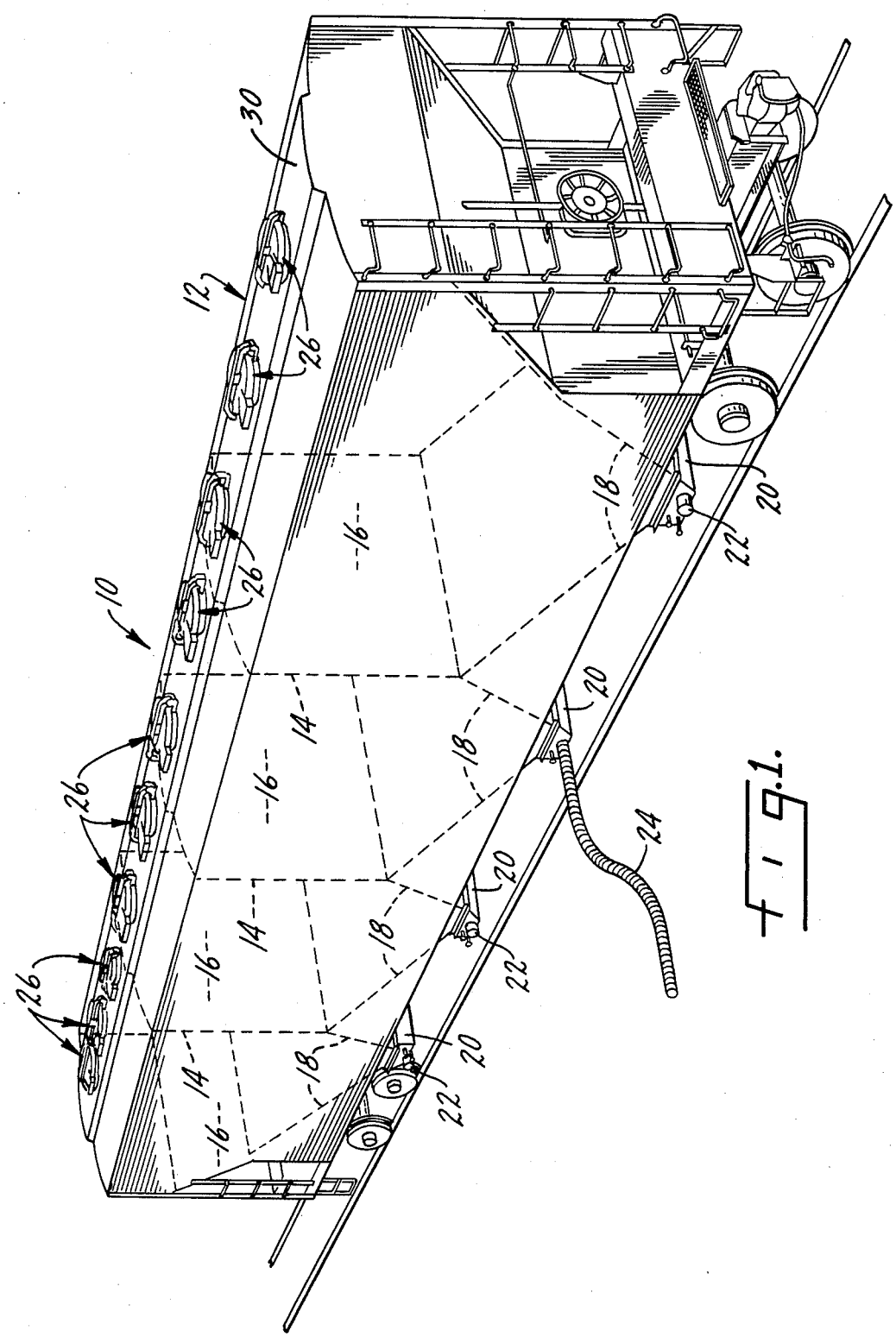
FIG. 1 is a perspective view of a covered hopper car.

The hatch cover of the present invention is illustrated in association with a covered railroad hopper car 10 shown in FIG. 1. The hatch cover is suitable for use with any vessel which requires ventin. Car 10 is adapted to carry particulate fluent material such as pallets, which are a raw material in the manufacture of various plastics. The car includes a body 12 mounted on conventional trucks at either end. The interior of the body 12 has partitions 14 defining compartments or vessels 16. Each compartment has a pair of slanted bottom walls 18 which direct particulate matter to an outlet gate 20 at the bottom of each compartment. Each outlet gate has a duct 22 to which a vacuum conveying line 24 may be connected. The opposite side of the outlet gate 20 has a port (not shown) similar to duct 22, which admits the primary air supply for unloading purposes. As explained above, the top of each compartment must also be vented during unloading. It has been determined that venting must accommodate the change in volume resulting from movement of material from the compartment. In some instances it has also been found that air for movement of the material also is drawn from within the vessel. This usually occurs when the compartment is nearly empty and the air is drawn through the interstices between individual particles. The vented hatch cover of the present invention, shown at 26, accommodates such air flow requirements.

Turning now to FIGS. 2–7, the vented hatch cover 26 is shown mounted on the exterior of car body 10. A hatch is built into the roof of the car body. The hatch itself comprises an opening 28 in the roof 30 of the car body. A hatch coaming 32 surrounds the opening 28. In this illustrative embodiment of the railroad car, the top edge of the coaming has a turned-over flange 34 (FIG. 3), though not all hatch coamings include such a flange.

The hatch cover 26 is retained on the coaming 32 by an over-center locking arm 36. The locking arm is rotatably fixed at one end to a bracket 38, which is attached to the coaming 32. The locking arm is connected to the hatch cover 26 by means of a bolt 40 which extends through lugs 42. The lugs are fixed to the hatch cover. The end of the locking arm 36 opposite the bracket 38 carries a pin 43. The pin is engageable with a pair of slots 45 formed in a latch 44. The latch is pivotable on the top portion 47 of a T-shaped catch 46, which in turn is pivotally connected to a bracket 48 on the hatch coaming 32. Clockwise rotation (as seen in FIG. 4) of the latch 44 captures the pin 43 in the slots 45 to hold the locking arm 36 in place.

Turning how to the details of the hatch cover itself, the cover is preferably made from a polymeric material such as any high impact, weatherable, ultra-violet resistant, thermoplastic, including, polypropelene, A.B.S., polycarbonate, rigid P.V.C., nylon, polyester. Of course, aluminum or stainless steel or fiberglass could be used.

The cover has a shell member 50 which is sized to fit over the hatch opening 28 and extend somewhat beyond the flange 34. The shell member has an outer surface 52 and an inner surface 54. A rim 56 extends downwardly from the periphery of the shell 50. An annular lip 58 coaxial to the rim also depends from the lower surface 54 of the shell. The lip is spaced inwardly from the rim 56 and forms a seat 60 (FIG. 5) between the lip and rim for a seal element 62 (FIG. 3). The seal element engages the upper end of coaming 32, in this instance, flange 34, to provide weather-tight engagement between the vented hatch cover and coaming.

The inner surface 54 of the shell member further includes a reinforcing ring 66. A plurality of radial ribs 68 are formed on the inner surface of the shell, extending from the reinforcing ring 66 to the annular lip 58. The ribs 68 add rigidity to the shell member.

The shell defines an air passage 70, extending through the shell member 50, between ribs 68A and 68B (FIG. 5). A special, short rib 72 extends from the reinforcing ring 66 to the interior edge of the opening 70.

A wall 74 is formed upon the outside surface of the shell member 50 and defines a plenum or air flow duct 76 overlying air passage 70. The wall is integrally formed on the shell member to afford a weather-tight enclosure over the air passage. Air flow through the plenum is indicated by arrows 78. An upper rib section 80 is located on the underside of the wall to stiffen it.

The wall 74 further includes a radial extension portion 82. The extension can be thought of as that portion of the wall extending beyond the peripheral rim 56. The extension portion has an end wall 84 and side walls 86 that project downwardly beneath the rim 56 where they are joined by a bottom wall 88. The extension portion 82 defines an air intake opening 90 facing radially inwardly toward coaming 32. The air intake opening 90 communicates with the plenum 76 to admit air to the air passage 70. An air filter element 92 is placed inside the plenum, here within extension portion 82. The filter may be any form of suitable filter media, such as reticulated polyurethane foam. It is removable and replaceable.

It will be noted that the outer surface of the shell member slopes downwardly from the center, imparting an overall domed configuration to the shell. The wall 74 projects upwardly and outwardly from the shell. This construction provides efficient air exchange while presenting an air flow path that prevents entrance of contaminants. That is, the air intake opening is radially outboard the coaming which defines the hatch opening and air flow though the plenum is sufficiently circuitous that droplets of water, snow or other contaminants are unlikely to be carried through the plenum to the air passage 70.

The wall 74 is shaped so as to define a plenum large enough to permit sufficient air flow for unloading purposes. It has been found, that air flow required to compensate for volume change due to discharge of particulate matter is in the order of about twenty to twenty-five cubic feet of air per minute. The air intake opening, air passage 70, and plenum cross-sectional area are sized to accommodate such flow requirements and such additional flow as occurs as air is drawn from the compartment during emptying. Thus, there is no chance of reducing efficiency of the unloading process or damaging the car body due to negative pressure. Also, since air intake opening is always open, it also compensates for atmospheric pressure changes arising due to significant changes in elevation, as when the car crosses mountains.

An alternate arrangement of the extension portion is shown in FIG. 8. The air intake opening is relocated in this embodiment by attaching an inside wall 94 to the rim 56 in the space between the side walls 86 and removing the bottom wall. This defines an air intake opening 96 which faces downwardly rather than inwardly. Again the opening is outward of the hatch opening to prevent ingress of foreign matter.

While a preferred form of the invention has been shown and described, it will be understood that alterations to the illustrated embodiments could be made without departing form the scope of the following claims. In this regard it should be noted that the wall 74 need not extend upwardly. For example, it is contemplated that, perhaps, the shell member 50 could be continuous and the wall 74 form a plenum on the interior surface 52 of the shell member. An air passage 70 would then be formed in wall 74, rather than shell member 50. Important to the invention, however, the air inlet opening is to be disposed outward of the peripheral extent of the hatch opening to prevent ingress of contaminants.

What is claimed is:

1. A hatch cover for a container of the type having an opening defining a hatch, and a coaming on the exterior of the container surrounding the hatch opening, said cover comprising; a single shell member sized to fit over and enclose the hatch opening and having an interior surface to close the hatch opening and an exterior surface exposed to atmosphere, said shell member further having at least one air passage therethrough, seal means on the interior surface of the shell member adapted to contact and seal against the coaming, a wall formed on the exterior surface of said shell member defining a plenum overlying said at least one air passage, said wall defining an air inlet passage to said plenum disposed radially outward of said seal means and below said air passage defined by said shell member.

2. The hatch cover of claim 1 wherein the wall defines an extension portion which extends below the periphery of the shell member.

3. The hatch cover of claim 2 wherein the air intake opening is located beneath the periphery of the shell member and faces toward the shell member.

4. The hatch cover of claim 2 wherein the air intake opening is located beneath the periphery of the shell member and faces downwardly.

5. The hatch cover of claim 1 further comprising an air filter element disposed with in the extension portion.

6. The hatch cover of claim 1 further characterized in that the shell member's outside surface slopes downwardly toward its periphery to impart an overall domed configuration, and the wall projects from the upper surface of the shell member.

7. The hatch cover of claim 1 further comprising a downwardly-extending rim formed around the periphery of the shell member.

8. The hatch cover of claim 7 further comprising a lip formed on the inside surface of the shell member, spaced from the rim to form a seat therebetween and a seal element disposed on said seat.

9. The hatch cover of claim 8 further comprising a plurality of ribs formed on the inside surface of the shell member.

10. The hatch cover of claim 2 wherein said cover includes an inside surface defining a seat about the periphery thereof, a seal for sealing against the coaming of a hatch is disposed upon said seat and said air intake opening is disposed outboard of said seat surface.

11. The hatch cover of claim 10 wherein the wall defines an extension portion extending beyond the periphery of the shell member and there defines the air intake opening, which admits air into the plenum.

12. The hatch cover of claim 11 wherein the extension portion extends below the periphery of the shell member.

13. The hatch cover of claim 12 wherein the air intake opening is located beneath the periphery of the shell member and faces toward the shell member.

14. The hatch cover of claim 12 wherein the air intake opening is located beneath the periphery of the shell member and faces downwardly.

15. The hatch cover of claim 11 further comprising an air filter element disposed with in the extension portion.

16. The hatch cover of claim 10 further characterized in that the shell member's outside surface slopes downwardly toward its periphery to impart an overall domed configuration, and the wall projects from the upper surface of the shell member.

17. The hatch cover of claim 10 further comprising a downwardly-extending rim formed around the periphery of the shell member.

18. The hatch cover of claim 17 further comprising a lip formed on the inside surface of the shell member, spaced from the rim to form a seat therebetween and a seal element disposed on said seat.

19. The hatch cover of claim 18 further comprising a plurality of ribs formed on the inside surface of the shell member.

* * * * *